United States Patent Office 3,448,434
Patented June 3, 1969

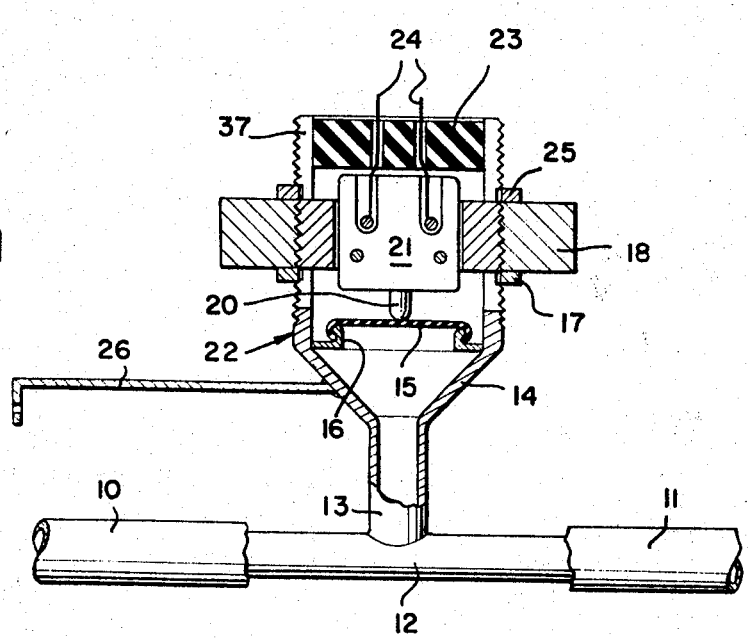
FIG.1
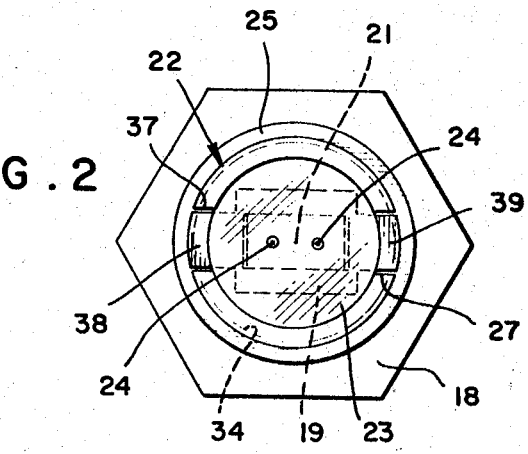
FIG.2
FIG.6
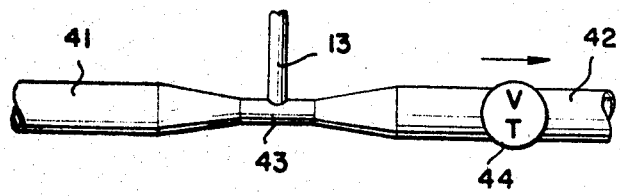
INVENTORS
ALBERT C. NOLTE Jr.
ALLISON C. COLLARD INVENTORS.
ALBERT C. NOLTE Jr
ALLISON C. COLLARD

3,448,434
DECELERATION WARNING-INDICATION SYSTEM FOR MOTOR VEHICLES
Albert C. Nolte, Jr., Oyster Bay Cove, and Allison C. Collard, Douglaston, N.Y., assignors to The Elton Industries Corporation, New York, N.Y., a family holding company
Filed Mar. 23, 1966, Ser. No. 536,885
Int. Cl. G60r 25/10
U.S. Cl. 340—71                          3 Claims

ABSTRACT OF THE DISCLOSURE

Apparatus for producing a warning indication for a decelerating vehicle which senses changes in fluid quantity to the engine, either in a vacuum line or in the fuel line of the engine. In order to produce the warning indication, the apparatus uses a pressure-actuated switch provided with a plunger, the latter being activated by a moving diaphragm.

---

This invention relates generally to a warning-indication system for motor vehicles, and in particular to a warning-indication signal-system which is responsive to the deceleration in speed of a vehicle such as a sportscar, motor-skooter, tractor-trailer truck, and the like.

It is known that in vehicle of this nature, considerable deceleration or braking of the vehicle may be obtained by downshifting or lowering the speed-ratio of the power-transmission train, so that the engine assumes a considerable portion of the braking of the vehicle. This technique of braking is employed by drivers of said vehicles to control the speed of the vehicle particularly when driving around corners, or descending along hill or mountainside, and while the accelerator pedal of the vehicle is released. This technique of braking is particularly advantageous in decelerating the vehicle for long periods of time without the necessity of applying the normal brakes, and therefore eliminates the disadvantages of having the brakes fade or fail during the deceleration of the vehicle.

It is well known to connect the lamp indicator at the rear of a vehicle to indicate to the driver of any following or trailing vehicle that the brake pedal of the forward vehicle is being depressed, so as to indicate that that vehicle is slowing down. As a result of this indication, drivers of following or trailing vehicles are made aware that they must also decelerate or slow down their vehicle to avoid rear-end collisions with the forward vehicle. There are also known systems by which a signal is given to drivers of trailing vehicles to indicate the transmission gear-ratio in which the forward vehicle is operating. However, there are no devices by which the driver operating the forward vehicle may indicate to the drivers of all trailing vehicles that he is reducing his speed by downshifting his power-transmission and thereby using his engine for decelerating his vehicle.

It is therefore, an object of the present invention to provide a warning system which indicates to the drivers of all following vehicles that the driver of the leading vehicle is decelerating his vehicle by means of downshifting the power transmission train connected to his engine.

It is another object, according to this invention, to provide such a device which may be easily installed into all types of motor vehicles, both vehicles presently on the road and those newly manufactured.

It is another object of the present invention to provide a warning-indication system of the kind described above which is simple in design, and inexpensive to manufacture, for all types of motor vehicles employing both internal combustion and diesel engines.

These and other objects of the invention will readily be understood with reference to the following detailed description of a specific embodiment with reference to the accompanying drawings which form a part thereof and wherein the numbered elements correspond throughout the several views:

FIG. 1 is an isometric view partly in section of the inventive switch assembly according to the invention shown, connected to the vacuum-line leading to the intake manifold of an internal combustion engine;

FIG. 2 is the top view of the switch-assembly according to the invention as shown in FIG. 1;

FIG. 6 is a venturi for sensing the fuel pressure in a diesel engine according to the invention.

Figure 3:
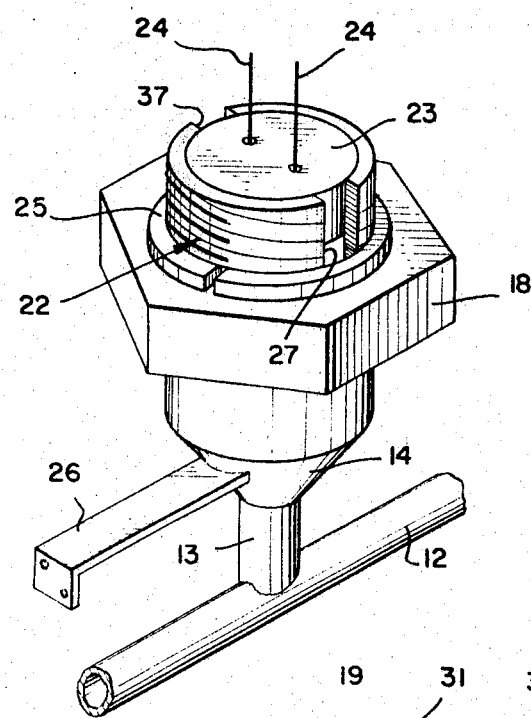
FIG. 3 is a further isometric view according to the invention, taken from an angle of the switch.
Figure 4:
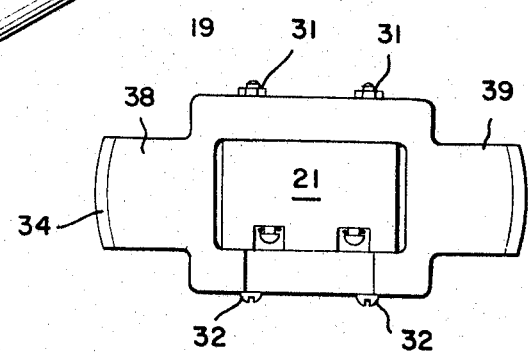
FIG. 4 is an enlarged top view of an adjustable carriage assembly of the embodiment of FIG. 1.
Figure 5:
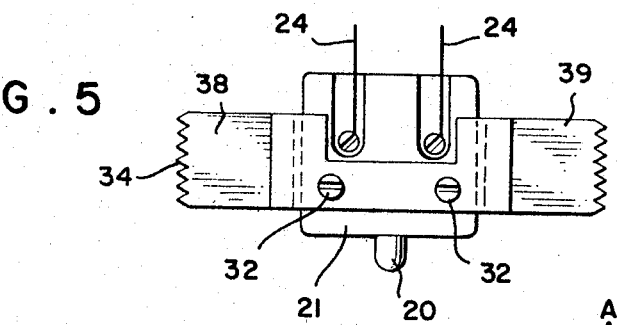
FIG. 5 is a side view of the embodiment of FIG. 4.

Referring to FIG. 1 there is shown a pressure- or vacuum-sensitive switch assembly coupled with the broken or severed ends 10 and 11 of a vacuum line of an internal combustion engine by a T-connection 12.

T-connection 12 which interrupts vacuum line 10 and 11 may be made at any convenient location in an internal-combustion engine, such as along the windshield-wiper hose, the power-brake hose, the vacuum-hose leading to the distributor for spark-advance purposes, or the vacuum line which leads from the intake manifold to the opening at the top of the carburetor for certain types of carburetors used in internal combustion engines. The vacuum or pressure-operated switch assembly contains a funnel portion 14 communicative with T-connection 12 through tube 13 integrally formed thereof to which a mounting bracket 26 is joined to permit the switch assembly to be mounted in any one of a number of convenient locations at the top or sides of the engine. Funnel portion 14 is integrally joined to cylindrical portion 22, which provides support for the elements within the switch assembly. At the intersection of body portion 22 and funnel portion 14 is a circular internal flange plate 16 having a circular beaded rim portion adapted to receive an elastic diaphragm 15 stretched thereacross. A sealing compound may also be applied to the beaded portion of flange 16 so as to seal diaphragm 15 to the flange, against the contamination of any moisture or other environmental elements. It is also conceivable that diaphragm 15 may be secured to flange 16 by any conventional fastening means such as a pressure plate or internally threaded screw, so as to maintain the diaphragm tightly stretched across the opening in the flange. The diaphragm 15 will obviously be responsive to the pressure, positive or negative, in the funnel portion 14.

Along the outer circumference of body portion 22 are contained a pair of annular slots that are coplanar and spaced apart axially of the body portion 22 to receive retaining rings 17 and 25. In the assembly of the switch, retaining ring 17 is first snapped into place in the annular slot adjacent to the funnel portion 14. A nut 18 of hexagonal configuration and having an internal threaded portion is then inserted concentrically over the body portion 22 and comes to rest along said body portion at retaining ring 17. The second retaining ring 25 is then inserted in the uppermost of said annular slots on body portion 22, in close-spaced relation thereto, so as to restrain nut 18 from longitudinal motion along body portion 22 while allowing it to freely rotate around the body.

As shown in FIG. 3, cylindrical body portion 22 contains a pair of axially-extending slots 27 and 37 disposed diametrically opposite one another and extending substantially along the portion of the body.

A carriage 19 as shown in FIGS. 1, 2, 4 and 5 has oppositely extending arms 38 and 39 adapted to be mounted slidably in slots 27 and 37. The carriage also contains a helical thread 34 cut into each of its extending arms 38 and 39 which are adapted to mate and correspond with the internal threads of nut 18. The hollow center portion of carriage 19 is adapted to receive a microswitch 21. Switch 21 is secured to carriage 19 by means of through bolts 32 and connecting nuts 31. Conductors 24 are coupled to corresponding screws which are joined to the electrical contacts within the microswitch. Microswitch 21 contains an outwardly-extending plunger 20 which is spring-loaded to the actuating mechanism of the switch, and when installed into the switch body itself is adapted to make contact with diaphragm 15.

Carriage 19 is assembled into the body portion 22 by inserting its extending arms 38 and 39 into slots 27 and 37 until the helical thread 34 comes into contact with the internal helical thread of nut 18. Assuming that thread 34 and its corresponding helical thread on nut 19 are right-handed it is then only necessary to rotate nut 18 clockwise as shown in FIG. 2 in order to let threads 34 engage the internal threads of nut 18 and thereby move the carrier and thus microswitch 21 against diaphragm 15. Thus, it is possible by means of rotating nut 18 either clockwise or counter-clockwise to move microswitch 21 either closer to or further away from diaphragm 15. This enables one to easily adjust the position of microswitch 21 and thereby set the switch so as to turn it on at any desired pressure or vacuum.

In addition to the elements of the switch assembly hereinbefore described, a resilient grommet or seal 23 is inserted into the exposed end of body portion 22 and extends within the body portion, terminating a short distance above carriage 19. Grommet 23 contains a pair of holes to permit conductors 24 to extend therethrough for connection to an indicating device (not shown). Grommet 23 is initially designed to have a diameter larger than the inside diameter of the body portion 22 of the switch assembly so that when inserted into the body portion, it will be in a compressed state and exert pressure against the walls of body 22. Due to the fact that body 22 contains slots 27 and 37, it is obvious that the walls of the body will expand outwardly and press against nut 18, thereby restraining the rotation of nut 18 around the body portion of the switch. It is conceivable that in the portion of body 22 in contact with nut 18, a non-skid surface such as a rubber element or knurled surface may be provided to additionally restrain the rotation of nut 18 when the elastomeric grommet 23 is inserted.

In internal-combustion engines commonly employed in motor vehicles such as trucks, sports cars and motor-skooters and the like, it has been found that the amount of vacuum of the engine intake manifold is approximately proportional to the amount of compressive braking to which the engine is subjected. In a typical automobile, the internal combustion engine maintains a vacuum between 16 and 20 inches of mercury-column during idling, or constant-speed running on level terrain. The manifold vacuum decreases considerably when the engine is accelerated and will approach zero inches of mercury-column under conditions of maximum acceleration. Likewise under conditions of extreme deceleration, the manifold vacuum in the internal-combustion engine will raise considerably above the 16 to 20 inches of mercury-column vacuum, and approach 30 inches of vacuum so that the amount of braking which the engine does during its deceleration of the vehicle has been found to be approximately proportional to the manifold vacuum. Thus, it is possible to insert the switch assembly of FIGS. 1–5 into one of the three or four afore-designated positions of the engine which are connected to the intake manifold and thus sense the vacuum of the intake manifold and thus the deceleration of the vehicle.

In its initial condition, the conductors 24 of the microswitch shown in FIGS. 1–5 are connected to a warning-indication system of the vehicle, such as to the brake-light switch, and the switch is maintained in a normally open position by rotating nut 18 clockwise until plunger 20 contacts diaphragm 15 and is depressed sufficiently to open the contacts within the microswitch 21. The switch assembly is then connected into one of the vacuum lines leading to the intake manifold of the internal-combustion engine and connected to one of the accessory parts of the engine by means of bracket 26.

The engine is then started, and while running builds up a normal manifold vacuum which as aforementioned for most engines is between 16 and 20 inches of mercury-column. Nut 18 is then rotated counter-clockwise until the microswitch is backed off to a position just prior to closure by the contact within. The normal vacuum which is maintained in the engine during idling and running along level terrain will cause diaphragm 15 to stretch downwardly and cause movement of plunger 20 which has been urged there against. Upon deceleration of the engine, the manifold vacuum will increase further stretching diaphragm 15 and thereby moving plunger 20 outwardly away from microswitch 21 toward a normally-open position. It is thus possible to adjust the setting of the microswitch by means of nut 18 so that the switch will close at any desired vacuum setting. The switch assembly can thus be used to indicate by means of a warning light system, such as if one connected to the brake lights of the vehicle, the amount of acceleration or deceleration of the vehicle.

It is preferred that switch 21 be of the microswitch type design because a minimum amount of travel by diaphragm 15 is required to activate and deactivate such a switch. Since microswitches inherently have a hysteresis effect, whereby the position of diaphragm 15 for activating the switch will not necessarily be the same position as for deactivating the switch, certain additional advantageous features of this effect may be employed. For example, if a microswitch such as the switch 21 is inserted in carriage 19, the hysteresis movement of the plunger may be sufficiently long so that after deceleration of the vehicle the microswitch will not open under normal vacuum conditions, but only upon acceleration of the vehicle when the vacuum decreases substantially below the normal vacuum state. This type of switch has the advantage that the warning-indication lamp remains lighted not only throughout the deceleration period of the vehicle, but further during subsequent normal-travel conditions, whereby the vehicle is travelling at a constant speed on a level terrain, so that additional warning is provided to any trailing vehicles that the driver has recently decelerated his vehicle. The warning indication lamp will thus remain lighted until the driver accelerates his vehicle and resumes the normal driving speed of the road.

For diesel applications, such as on large tractor-truck trailers and the like, the engine has no intake-manifold. Unlike internal-combustion engines, diesel engines depend on the rate of fuel-feed rather than the air-flow to control the speed of the engine. It is, therefore, possible to use the switch assembly of FIGS. 1–5 in a venturi tube arrangement coupled to the main fuel line leading to the fuel injection nozzles of the diesel, and determine the deceleration of the diesel engine from the rate of fuel-feed to the engine.

Referring to FIG. 6 there is shown a typical section of the fuel line of a diesel engine whereby section 41 of the line is coupled to the fuel pump of the diesel engine and section 42 coupled to throttle valve 44 leads to the fuel injection nozzle located at each of the cylinders of the engine. Intermediate section 41 and valve 44 is a venturi 43 consisting simply as a restriction having a reduced diameter in the fuel-line tubing. Coupled to the center of venturi 43 is pressure line 13 which leads and is common to the switch assembly as shown in FIGS. 1–5. It is well known that the rate of flow of the fuel through the venturi 43 will be inversely proportional to the pressure of the fuel as detected by line 13. As the diesel engine accelerates, the rate of flow of fuel through lines 41 and 42 increases so as to cause a decrease in the pressure through the venturi and sensed by line 13. When the throttle-valve 44 is inserted in line 42, a controlled amount of fuel is admitted to the fuel injectors, which amount controls the speed of the diesel engine. To accelerate the diesel engine, throttle valve 44 is opened wide so as to cause a large amount of fuel to flow through lines 41 and 42 to the fuel injectors and thereby decrease the pressure in the line at venturi 43 as sensed by tube 13. When the diesel engine is idling, throttle valve 44 only permits a small amount of fuel to reach the fuel injectors and therefore, the pressure as sensed in venturi 43, and as measured by tube 13 is proportionately higher. However, when the diesel engine is coupled to a vehicle which is decelerating and using the braking-force of the engine to slow down the vehicle, the pressure in the fuel-line becomes proportionately higher than during any other operating conditions of the diesel engine, due to the fact that throttle valve 44 remains partially closed while the fuel pump (not shown) coupled to the drive shaft of the diesel engine is pumping near its maximum rate due to the high speed of the engine during the deceleration. It is, therefore, possible to employ the valve as shown in FIGS. 1–5 to sense this high pressure during the deceleration of the diesel engine and thereby produce a warning signal to any trailing vehicles by setting adjustable nut 18 to a predetermined position so that the plunger 20 of microswitch 21 is depressed by the inward force of diaphragm 15 as to close the contacts of switch 21, and thereby produce a warning indication. It is obvious that the conductors 24 of microswitch 21 may be connected across the brake-light system of any diesel tractor-trailer so that all of the brake-lights of both the tractor and trailer will be lighted when the driver uses the diesel engine to decelerate the vehicle. This feature of the invention finds particular use for trucks which travel over mountainous terrain and depend upon the braking of the engine, while operating the vehicle in low gear, to decelerate the tractor and the trailer on steep downgrades.

What we claim is:

1. Apparatus for producing a warning indication on a vehicle having an engine when said engine decelerates, said apparatus comprising: means for sensing changes in fluid quantity to said engine to produce a warning indication when said engine is decelerating, said sensing means comprising a pressure-operated switch coupled to the fuel supply of said engine, said switch being mounted in a carriage and being provided with a plunger, a tube connected with the vacuum of said engine, a yieldable diaphragm being connected across the vacuum of said tube, the plunger of said switch being disposed in contact with said diaphragm for operating said switch upon changes in fluid quantity supplied to said engine, a slightly resilient cylindrical body connected to said tube and having a plurality of slots extending through its side wall, said carriage located in said cylindrical body, said carriage having arms extending through the slots in said body and threaded at their outer ends, and a nut surrounding said body having its threads in mesh with the threads of said arms for holding said carriage within said body whereby when said nut is rotated in one direction said carriage and switch are moved axially in said body relative to said yieldable diaphragm and said switch is responsive to a selected pressure.

2. Apparatus as claimed in claim 1 wherein said body has two axially spaced apart annular slots in its external periphery, a retaining ring in each of said slots, and said nut being positioned and held between said retaining rings whereby rotation of said nut adjusts the position of said carriage and said switch axially of said body to thereby adjust the switch for response to a selected pressure.

3. Apparatus as recited in claim 1 further comprising an elastomeric grommet disposed within the open end of said cylindrical body having an outside diameter slightly larger than the inside diameter of the open end of said cylindrical body so as to be compressibly retained within said cylindrical body and thereby urge the walls of said cylindrical body against said nut.

References Cited

UNITED STATES PATENTS 3,372,372    3/1968    Carpenter et al. __ 340—262 XR

ALVIN H. WARING, *Primary Examiner.*

U.S. Cl. X.R.

200—81.9, 83; 340—240, 262